United States Patent [19]

O'Brien et al.

[11] Patent Number: 5,383,168
[45] Date of Patent: * Jan. 17, 1995

[54] ACTIVELY ATHERMALIZED OPTICAL HEAD ASSEMBLY

[75] Inventors: Michael J. O'Brien; William B. Smith, both of Rochester, N.Y.

[73] Assignee: Eastman Kodak Company, Rochester, N.Y.

[*] Notice: The portion of the term of this patent subsequent to May 11, 2010 has been disclaimed.

[21] Appl. No.: 41,641

[22] Filed: Apr. 1, 1993

[51] Int. Cl.$^6$ .......................... G11B 7/00; G02B 26/08
[52] U.S. Cl. ............................. 369/44.14; 369/44.23; 369/112; 359/820; 359/196
[58] Field of Search ............... 359/814, 821, 822, 823, 359/196, 820, 641; 385/33; 372/36, 34; 369/44.14, 44.23, 44.24, 44.15, 112, 114, 115, 118, 119

[56] References Cited

U.S. PATENT DOCUMENTS 5,101,412 3/1992 Pillsbury et al. .................. 372/34
5,210,650 5/1993 O'Brien et al. .................... 359/820

FOREIGN PATENT DOCUMENTS 59-229503 12/1984 Japan .................................. 359/820

Primary Examiner—Aristotelis Psitos
Assistant Examiner—Nabii Hindi
Attorney, Agent, or Firm—Thomas H. Close

[57] ABSTRACT

An optical head assembly includes a light beam source and collimating optics mounted in an active, thermally-compensated assembly. A collimating optics mount preferably in the form of a flexure plate having a three-point elastic hinge is supported on a base plate by a respective number of equally-spaced actuators. The motion of the flexure plate is thereby over constrained and allows the operation of the elastic hinge to benefit from elastic averaging such that motion of the flexure plate may be effected by the actuators individually or in combination. Controlled flexure plate motion may be implemented to compensate for thermal shifts in system focal length, while maintaining radial and angular alignment of the collimating optics relative to the beam source, according to the influence of the individual actuators. Active control of the actuators also allows controlled movement of the collimating lens in two degrees of lateral motion (x and y motions), in addition to a piston or z motion, and tilting or tipping motions.

11 Claims, 7 Drawing Sheets

ACTIVELY ATHERMALIZED OPTICAL HEAD ASSEMBLY

CROSS REFERENCE TO RELATED APPLICATIONS

This patent application is related to copending, commonly-assigned U.S. patent application Ser. No. 996,427, filed in the names of O'Brien et al on Dec. 23, 1992, and entitled "THERMALLY-CONTROLLED ROTARY DISPLACEMENT ACTUATOR OPERABLE FOR PRECISE DISPLACEMENT OF AN OPTICAL OR MECHANICAL ELEMENT", and to copending, commonly-assigned U.S. patent application Ser. No.08/041,730 now U.S. Pat. No. 5,303,080, filed in the names of O'Brien et al. on even date herewith, and entitled "BEAM SCANNING SYSTEM INCLUDING ACTIVELY-CONTROLLED OPTICAL HEAD", the disclosures of which are included herein by reference.

FIELD OF THE INVENTION

The present invention relates generally to a collimated light beam source and in particular to an actively controlled, dimensionally-stable light beam source and light beam collimating assembly for use in high resolution beam scanners.

BACKGROUND OF THE INVENTION

Light beam scanners used for input or output of a high resolution image require a dimensionally-stable beam source and beam collimating assembly, sometimes termed an "optical head". Such an assembly typically includes a light beam source, a collimating lens, and a means for maintaining a constant beam focal distance over the operating temperature range. In order to achieve adequate optical performance, the optical head must maintain a predetermined beam quality over a wide ambient temperature range.

In conventional apparatus, the beam source and collimating lens are mounted in a mechanical structure that attempts to maintain the beam focal length while the apparatus undergoes temperature-induced structural changes. Such athermalization (i.e., thermal compensation) is effected either passively or actively. Passive systems rely on the differences in the coefficients of thermal expansion of various movable elements in the optical system such that there is no net focal shift over temperature. Active systems compensate in the same manner, but employ actuators to effect movement of the optical elements. However, the foregoing approaches have been found to be more costly and complex, and offer less precision and less range of adjustment, than is desired for certain beam scanning applications.

Additionally, some conventional optical head assemblies are supported by an orthogonal four-point mechanical system, whereby the collimating optical components are located on a solid yoke that is separated from the beam source by four motor devices and suspended by four respective pin hinges. All motion of the yoke is constrained by the action of four respective hinges. Any movement of the yoke requires a push-pull operation of at least two opposing motors and hinges in tandem (e.g., one upward, and one downward) to achieve a particular, albeit limited, amount of repositioning of the collimating optical components. An optical head assembly that offers more freedom of motion of the collimating optics, and a simpler control apparatus for effecting such motion, would be advantageous.

SUMMARY OF THE INVENTION

The present invention is directed to overcoming one or more of the problems set forth above by active control of an optical head to achieve not only active athermalization of the beam collimation, but also other improvements in the positioning of the optical components in the optical head, to thereby offer higher optical performance. Accordingly, the preferred embodiments of the present invention achieve more exact compensation for thermally-induced focal shifts than may be obtained by a conventional actively athermalized optical head. In addition, the preferred embodiments of the present invention achieve improvements in the optical quality of the beam provided by the optical head, such as an increased accuracy in the steering or focusing of the light beam, by offering a greater freedom of motion of the means that support the collimating optics.

Briefly summarized, according to one aspect of the present invention, a preferred embodiment of an optical head assembly may be constructed to include a collimating optics mount including a flexure plate, light beam collimating optics fixed on the flexure plate and thereby defining an optical axis, and three flexure plate extensions being substantially equally distributed about the optical axis and each being attached to the flexure plate at a respective elastic kinematic hinge; and a light beam source mount having located thereon actuator means and a light beam source so as to direct a light beam through said collimating optics, said actuator means being operatively connected to each of the mount extensions for selective coupling of a displacement force through the respective elastic kinematic hinge to effect an adjustment of the position of the collimating optics with respect to the beam source.

In a particularly preferred embodiment, the optical head assembly may be constructed to include a light beam source and a collimating optics, both of which are mounted in an active, thermally-compensated assembly. The beam source is mounted in a beam source mount that is thermally isolated from a supporting base plate. The collimating lens is mounted on a lens mount preferably in the form of a flexure plate having a three-point elastic hinge. The flexure plate is supported on the base plate by a three actuators, each of which are located adjacent one of three elastic hinge points. The motion of the flexure plate is thereby over constrained and allows the operation of the elastic hinge to benefit from elastic averaging. Furthermore, the motion of the flexure plate may be effected by one actuator at a time, if desired. The actuators are operatively connected to an actuator control interface that is responsive to control signals for activation and control of the actuators. Active control of the actuators thereby allows controlled movement of the collimating lens in three degrees of axial motion (x, y, and z motions), in addition to tilting or tipping motions. Controlled flexure plate motion may also be implemented to compensate for thermal shifts in system focal length, while maintaining radial and angular alignment of the collimating optics relative to the beam source, according to the displacement effected by the individual actuators.

These and other aspects, objects, features and advantages of the present invention will be more clearly understood and appreciated from a review of the following detailed description of the preferred embodiments

DETAILED DESCRIPTION OF THE INVENTION

Figure 1:
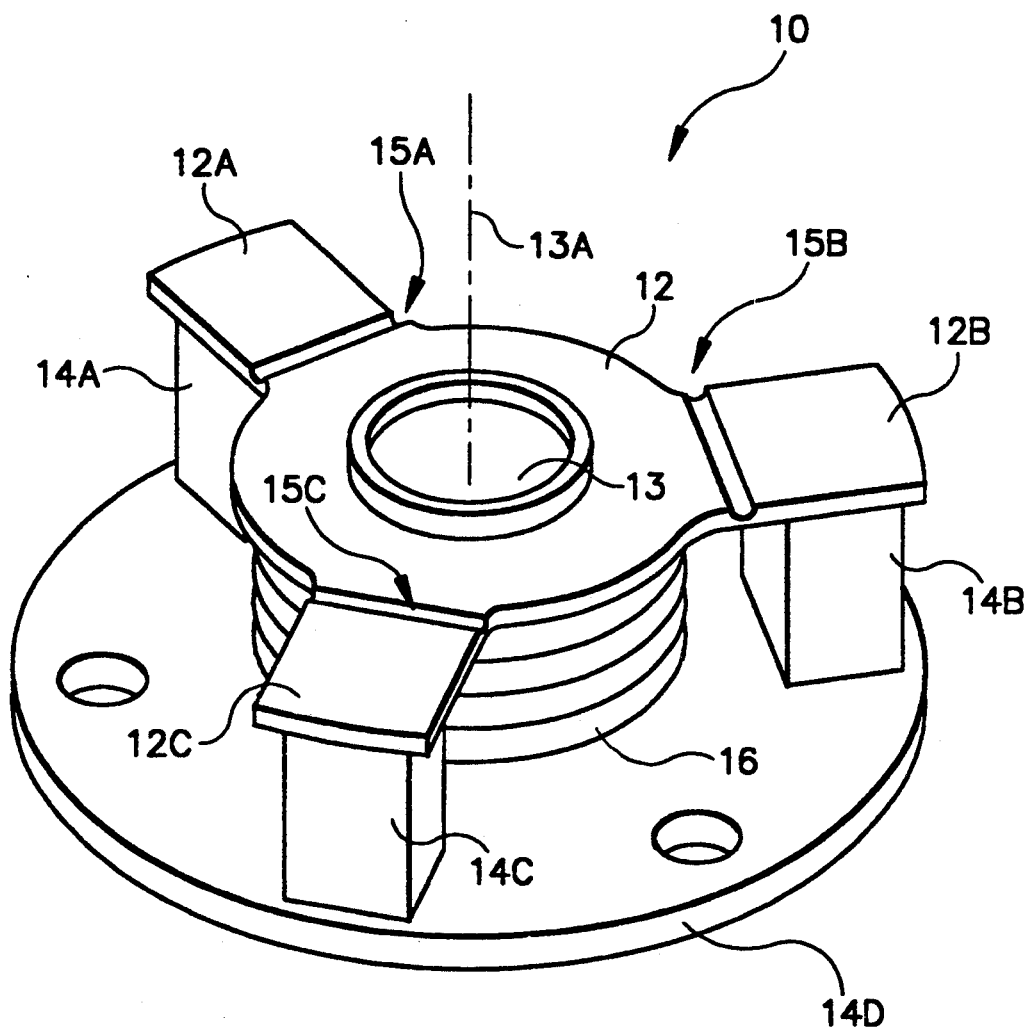
FIG. 1 is a side perspective view of an optical head assembly constructed according to the present invention. Certain portions of the assembly, such as the actuator controllers, are omitted for clarity.
Figure 7:
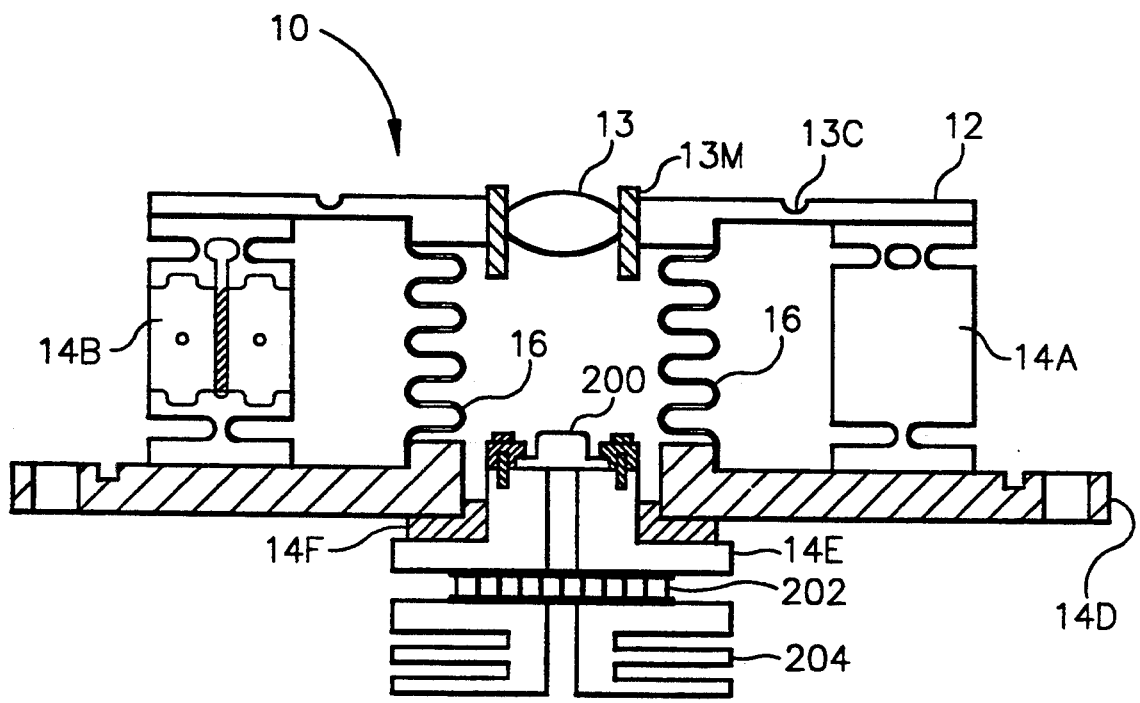
FIGS. 7 and 8 are simplified side sectional views of the optical head assembly of FIG. 3.

FIG. 1 illustrates an actively athermalized optical head 10 operable for compensation (athermalization) of thermally-induced focal shifts, and for improvement of the optical performance of the optical head, so as to effect an overall improvement in the provision of certain optical parameters such as beam steering accuracy. A collimating optics mount in the form of a flexure plate 12 includes collimating optics in the form of a collimating lens 13, a plurality of lens mount extensions 12A, 12B, 12C distributed equally about the optical axis 13A of the lens, and three respective elastic kinematic hinges in the form of annular notches 15A, 15B, and 15C. Each extension is supported by one of three respectively-spaced, individually-controllable actuators 14A, 14B, 14C that are fixably supported by a light beam source mount in the form of a base plate 14D. Each actuator may be selectively controlled to apply a displacement force that is coupled to the flexure plate by way of the respective elastic kinematic hinge. The beam source mount includes a light beam source, preferably in the form of a semiconductor laser diode 200, and optional light beam source cooling apparatus 202, 204 (both of which are shown in FIG. 7). A bellows 16 connected between the flexure plate 12 and the base plate 14D encloses the volume between the light beam source and the collimating lens, and is preferably filled with dry nitrogen.

Selective positioning of the collimating lens 13 by expansion or contraction of one or more actuators will effect both athermalization of the collimating optics, and repositioning of the location and orientation of the collimating lens 13 and the optical axis 13A. Hence, such an adjustment of the collimating lens position will effect a change in the corresponding location and orientation of the light beam emitted by the beam source. For clarity, the light beam is not illustrated but may be assumed to exit the optical head along the optical axis when the optical axis is coaxially aligned with the exit aperture of the beam source.

Figure 2:
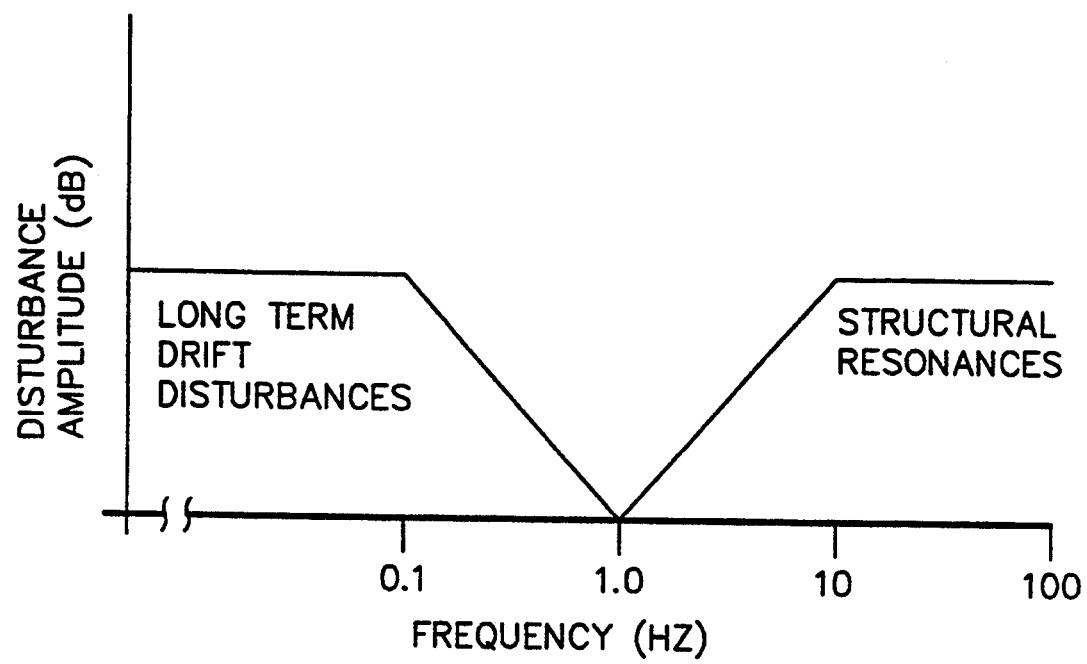
FIG. 2 is a simplified graphical representation of the disturbance spectrum experienced by a typical optical head assembly.

The optical head assembly 10 is preferably operated to provide a stationary collimated beam in a beam scanning apparatus useful in the production of scanned images. FIG. 2 shows the disturbance spectrum typically encountered by an optical head in a beam scanning apparatus, such as an image-writing copier or printer. A principal feature of the actively-controlled optical assembly 10 is its ability to actively reduce or eliminate the effects of long-term (low frequency) disturbances that would otherwise degrade the optical performance of the optical head assembly 10. One example of such a disturbance is the thermally-induced mechanical deformations of the optical assembly structure, due to changes in the ambient temperature, or due to the heat generated by the beam source.

Figure 3:
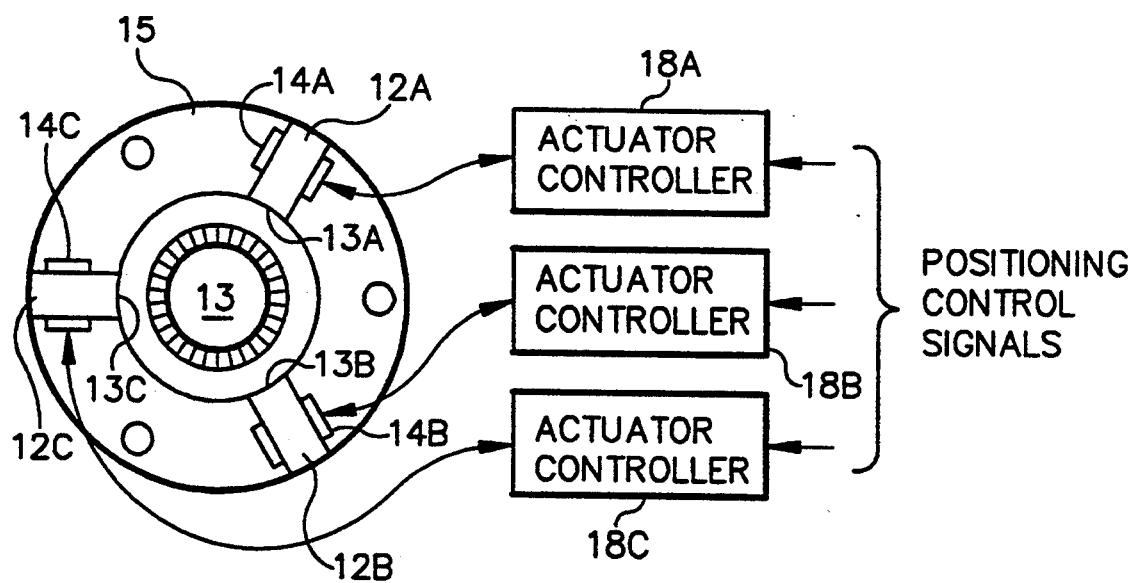
FIG. 3 is a top view of the assembly of FIG. 1, and includes a simplified representation of the actuator controllers.

FIG. 3 shows a top view of the optical head assembly 10, the actuators 14A, 14B, 14C, and three associated actuator controllers 18A, 18B, 18C. The actuators are preferably symmetrically positioned at 120, 240, and 360 degree points about the optical axis 13A. The actuator controllers may receive appropriate positioning control signals for individual, selective control of the respectively-connected actuators 14A, 14B, and 14C. Suitable control signal generating means may be provided according to servo system control theory known in the art, but an especially advantageous and particularly preferred embodiment may be constructed according to copending, commonly-assigned U.S. patent application Ser .No. 08/041,730 now U.S. Pat. No. 5,303,080, filed in the names of O'Brien et al. on even date herewith, and entitled "BEAM SCANNING SYSTEM INCLUDING ACTIVELY-CONTROLLED OPTICAL HEAD", the disclosure of which is included herein by reference. Further description of the actuator controllers are provided with respect to FIG. 5, below.

Figure 4:
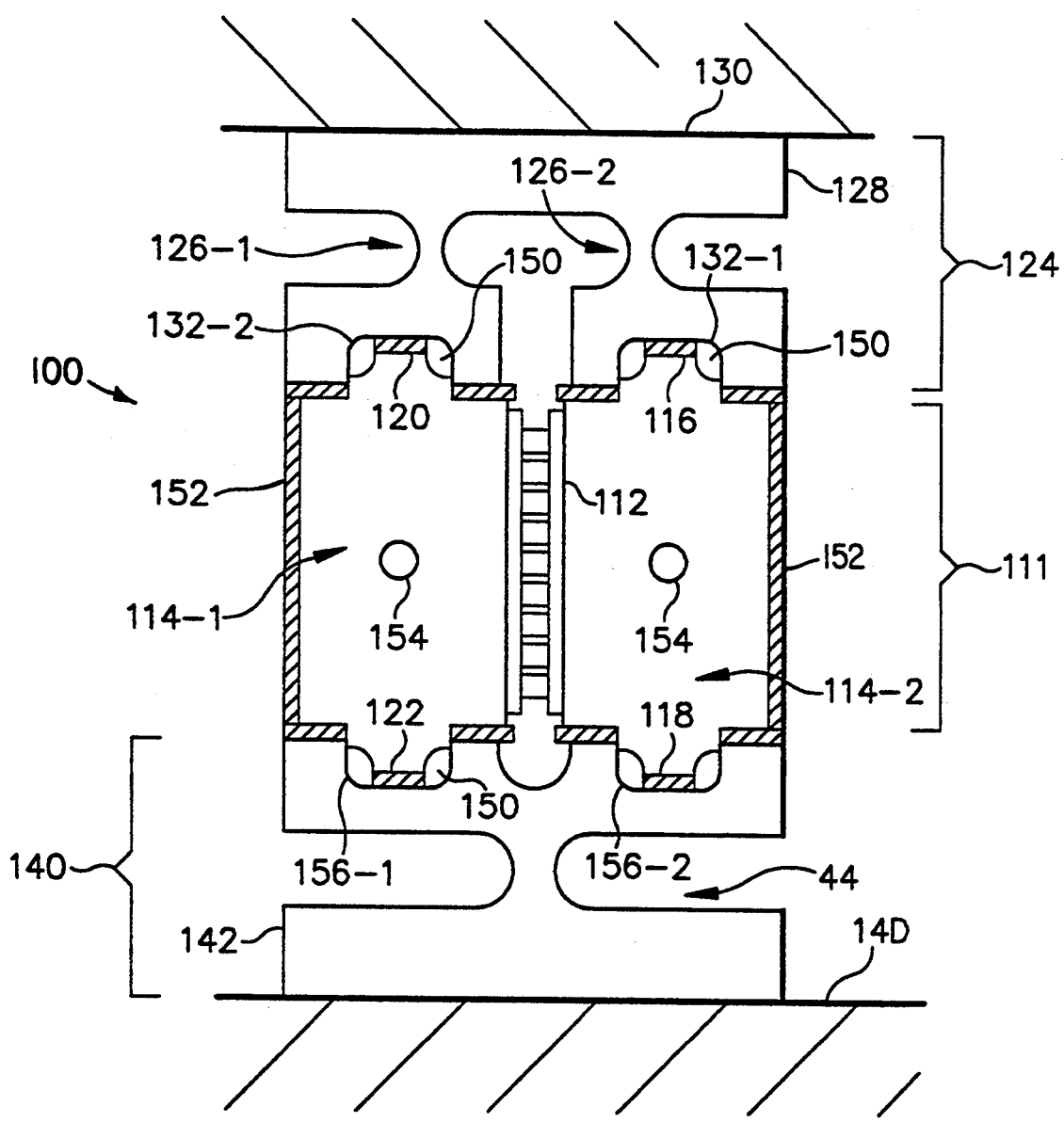
FIG. 4 is a side sectional view of a thermal rotary actuator useful in the optical head assembly of FIG. 3.

FIG. 4 illustrates a preferred embodiment of the actuators 14A, 14B, and 14C of FIG. 3. Controllable actuators as known in the art may be used, although each actuator in the preferred embodiment is provided in the form of a thermal rotary moment actuator 100 as disclosed in U.S. patent application Ser. No. 996,427, filed in the names of O'Brien et al on Dec. 23, 1992, and entitled "THERMALLY-CONTROLLED ROTARY DISPLACEMENT ACTUATOR OPERABLE FOR PRECISE DISPLACEMENT OF AN OPTICAL OR MECHANICAL ELEMENT", the disclosure of which is included herein by reference. Each preferred rotary displacement actuator 100 includes an actuator body 111 having an active thermal element, preferably in the form of a thermoelectric cooling element (TEC) module 112 that is located between first and second linear actuator elements 114-1, 114-2 to effect a selectable temperature difference between the linear actuator elements in response to an applied actuator driving signal. The length L of each linear actuator element is defined by its upper and lower ends 116, 118 and 120, 122. Linear actuator element seats 132-1, 132-2 receive the upper ends of the linear actuator elements 114-1, 114-2. Due to the particular coefficient of thermal expansion (CTE) of each linear actuator element 114-1, 114-2, the thermal energy imparted by the thermal element 112 to the linear actuator elements causes a differential H in the lengths $L_1$, $L_2$ of the linear actuator elements, which accordingly causes a rotation of an attached upper yoke 124.

The upper yoke 124 preferably includes first and second upper yoke flexures 126-1, 126-2 to apply a moment (torque) output to the mounting bar 128. The first and second upper yoke flexures allow the linear actuator elements to remain parallel during their expansion or contraction. The mounting bar 128 to provide an attachment surface 130 for the underside of the collimating lens mount 15 (cf. Figures 1 and 3) so as to receive the torque output of the rotary displacement actuator.

The thermal rotary actuator 100 further includes a lower yoke 140 which includes a mounting base 142, a lower yoke flexure 144, and a seat portion having seats 156-1, 156-2 for the two linear actuator elements. The lower yoke flexure 144 is preferably a single flexure, and thus the lower yoke connects to the mounting base 142 to support the actuator 110 and to connect the lower ends 118, 122 of the linear actuator elements to the mounting base 142. The flexure allows the body of the actuator 110 to pivot to accommodate kinematic changes during operation.

The linear actuator elements 114-1, 114-2 are insulated from the upper and lower yokes by an insulating adhesive compound 150 to minimize heat loss from the linear actuator elements. Preferably the insulating adhesive compound is an epoxy or epoxy/glass adhesive material having nearly the same CTE as the linear actuator elements and yoke. An epoxy-based adhesive, for example, may be used to bond the linear actuator elements into the mounting cavities. Also provided is an epoxy/glass enclosure 152 that insulates the sides of the linear actuator elements. These measures are intended to minimize the heat transfer between the linear actuator elements and their surrounding structure (excepting the TEC module 112), thereby minimizing the heat load on the TEC module 112. The contact resistance at the TEC module/linear actuator element interfaces is preferably reduced by use of heat conductive paste at the interfaces. Because commercially-available embodiments of the TEC module have thickness variations of up to 0.005", each thermal rotary actuator 110 is assembled with a preload on the linear actuator elements to insure intimate contact of each linear actuator element with the TEC module. The TEC module 12 is restrained by appropriate means such as protrusions (not shown) at the upper and lower ends of the linear actuator elements and the enclosure 152. This arrangement allows the TEC module 12 to remain in contact with the linear actuator elements 114-1, 114-2 while allowing the linear actuator element side walls to expand or contract against the TEC module, thereby preventing any loss of motion that would occur if the TEC module were otherwise fixed to the linear actuator elements.

Figure 5:
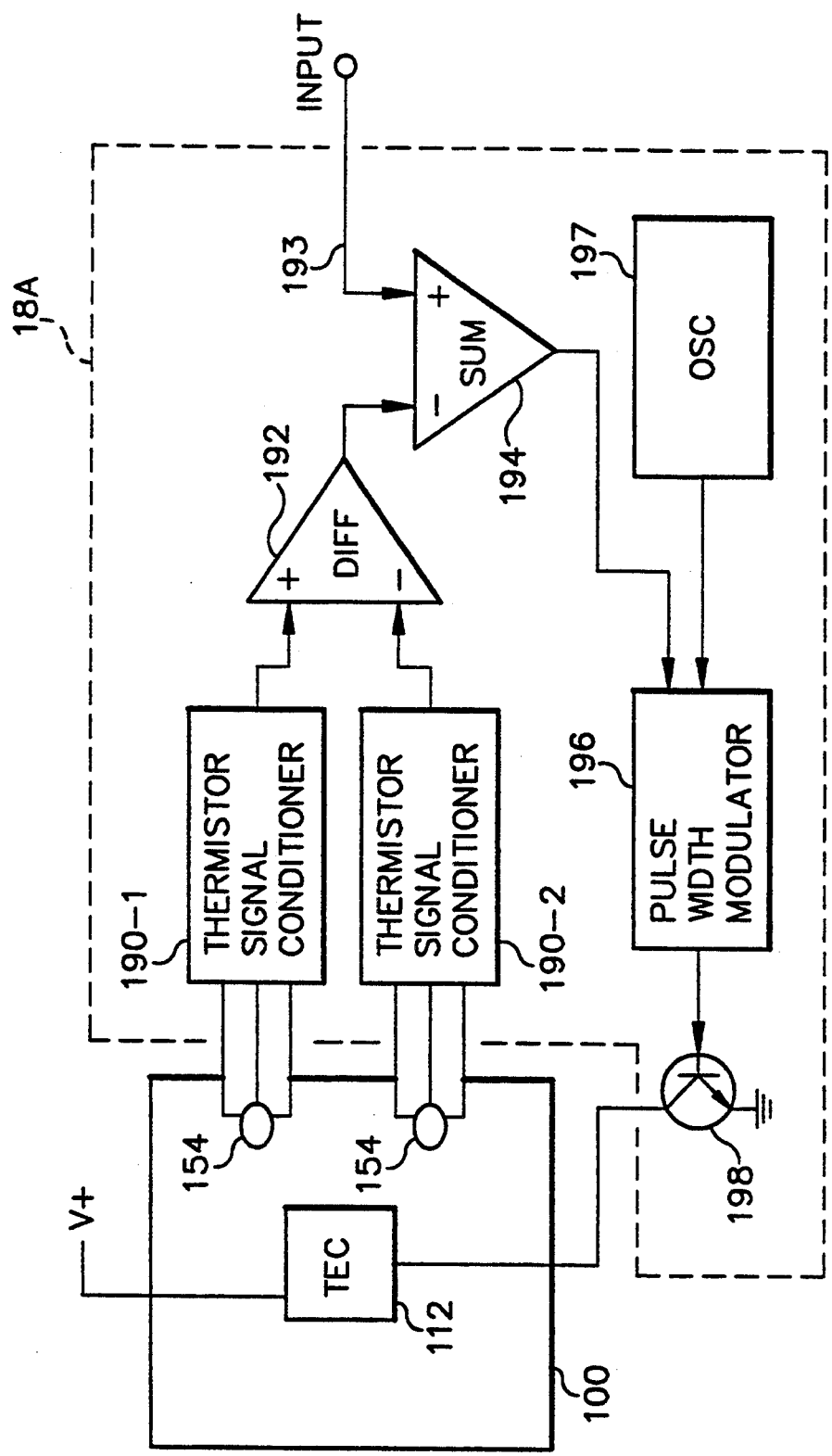
FIGS. 5 and 6 are simplified block and circuit diagrams, respectively, of an actuator controller of FIG. 3.

FIG. 5 illustrates a thermal rotary actuator 100 and an associated actuator controller (for example, controller 18A) in a simplified, block diagrammatic form. The first and second thermistors 154, embedded in the linear actuator elements 114-1, 114-2 provide respective temperature sense signals to respective first and second signal conditioners 190-1, 190-2. The linearized thermistors 154 thereby sense the actuator element temperatures, which are converted to voltages and then scaled by the signal conditioners. The conditioned signals are then subtracted by a differential amplifier 192 and added by a summer 194 to a position input signal on input line 193 to provide a scaled position input signal to a pulse width modulator (PWM) 196. Pulse width coding, according to the output signal from a stable oscillator 197, then allows the PWM to control a drive transistor 198 such that an actuator drive signal is selectively varied (according to the scaled position input signal) through the TEC element 112 in the thermal rotary actuator 100. The controller 180 will thereby maintain a selectable temperature differential in the active TEC element 112 in the actuator 100.

Figure 6:
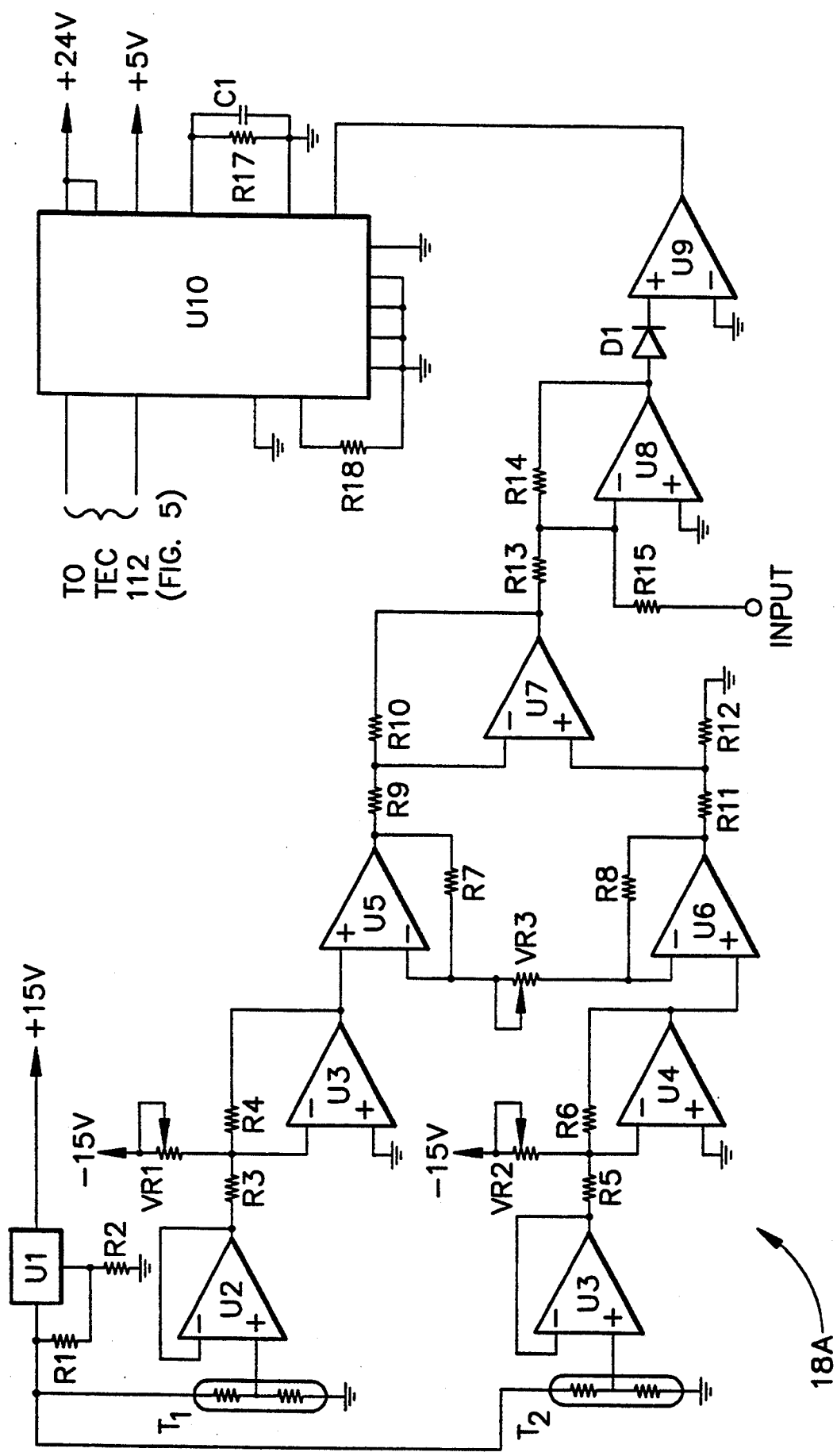

FIG. 6 illustrates one particularly preferred embodiment of the controller 18A in greater detail. A voltage regulator U1 and resistors R1 & R2 provide an excitation voltage of approximately +10 Volts to thermistors $T_1$ and $T_2$. Preferably, the thermistors $T_1$ and $T_2$ have 100 Kohm resistance at 25° C. and offer a linear response from at least 20° C. to 80° C. Such devices are commercially available as YSI44011 precision thermistors from the Yellow Springs Instrument Co. First and second field effect transistor (FET) input op-amps U2 and U3 buffer the sense signals from the thermistors so as to eliminate nonlinearities due to loading. A summing circuit includes op amps U3 and U4, resistors R3, R4, R5, and R6, and potentiometers VR1 and VR2. Zeroing of signal offsets at ambient temperature (e.g., 25° C.) may be accomplished via potentiometers VR1 and VR2. An instrumentation amp in the form of op amps U5, U6, U7 and resistors R7 through R12 allows gain adjustment via potentiometer VR3. A summing circuit including op amp U8 and resistors R13, R14, and R15 combines error and input reference voltages to provide a pulse width modulator input control voltage. A comparator U9 receives the analog control signal through diode D1 to toggle the drive current direction on the pulse width modulator U10. The oscillator frequency is preferably set to 1 kHz by selection of the values of resistor R17 and capacitor C1. Output current is limited by R18.

A high accuracy instrumentation amp such as the AD625 commercially available from Analog Devices may be substituted for the discrete op amps described above. Precision metal film resistors for R7 through R12 are preferred to provide adequate common mode rejection. A suitable PWM in the form of an integrated circuit is commercially available as the UDN2954W from Allegro Microsystems.

Figure 8:
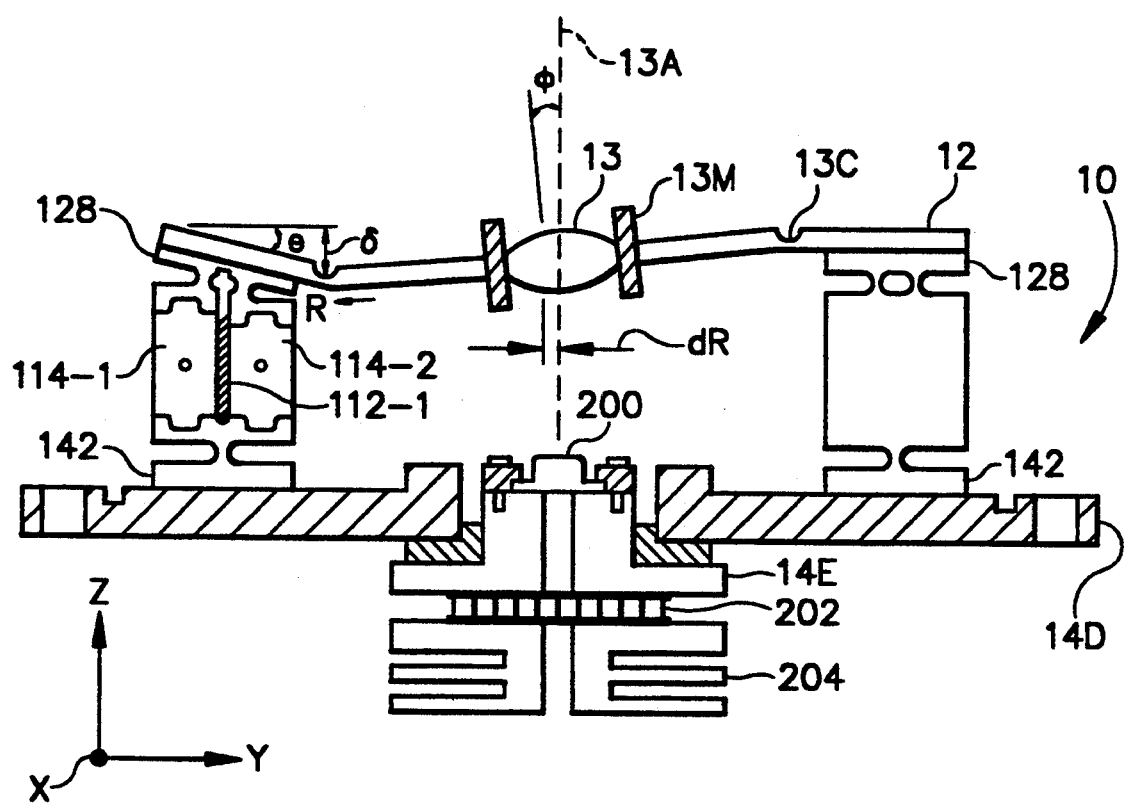

A sectional view of the optical head assembly 10 is shown in FIGS. 7 and 8. The collimating lens 13 (commercially available from Eastman Kodak Company as the model Q-28 lens) is preferably fixed in an epoxy adhesive within a central lens mount 13M in the flexure plate 12. Annular notches 15A, 15B, and 15C in the flexure plate 12 act as elastic kinematic hinges, causing the plate to bend or twist at the notches, depending upon the magnitude and direction of the combined torques applied by the controlled expansion or contraction of actuators 14A, 14B, 14C. The light beam source 200, preferably in the form of a Hitatchi HL7806G laser diode, is cooled by use of a thermo-electric cooler TEC 202 (such as may be purchased from Marlow Industries as the model SD1507) and a rear heat sink 204. The location of the light beam source 200 is fixed relative to the mounting base 14D by mounting the beam source on a copper heat spreader 14E attached to the base plate via a 15% glass filled polycarbonate insulating ring 14F. A thin electro-formed nickel bellows 16 (such as may be purchased from Servo Meter as the model FC-16) is electron-beam-welded to the underside of the lens mount 12, and soldered to the base plate 14D, to form an air-tight seal.

As further illustrated in FIG. 8, the temperatures of the TEC elements 112-1, 112-2 may be set to selected levels respectively above and/or below ambient temperature so that one linear actuator element 114-1 may be caused to expand while the other 114-2 is unchanged, or made to contract. (For example, in FIG. 8, the leftmost element 114-1 is shown expanded while the adjacent element 114-2 is contracted; the reverse may be implemented according to the temperature selection of the TEC 112 and by the selection of the CTE values of the linear actuator elements.) The two upper yoke flexures 126-1, 126-2 couple the mounting bar 128 to the linear actuator elements and define the vertical position of the center of rotation. The length differential of the linear actuator elements confines the center of rotation of the mounting bar 128 to the actuator center line.

Figure 9:
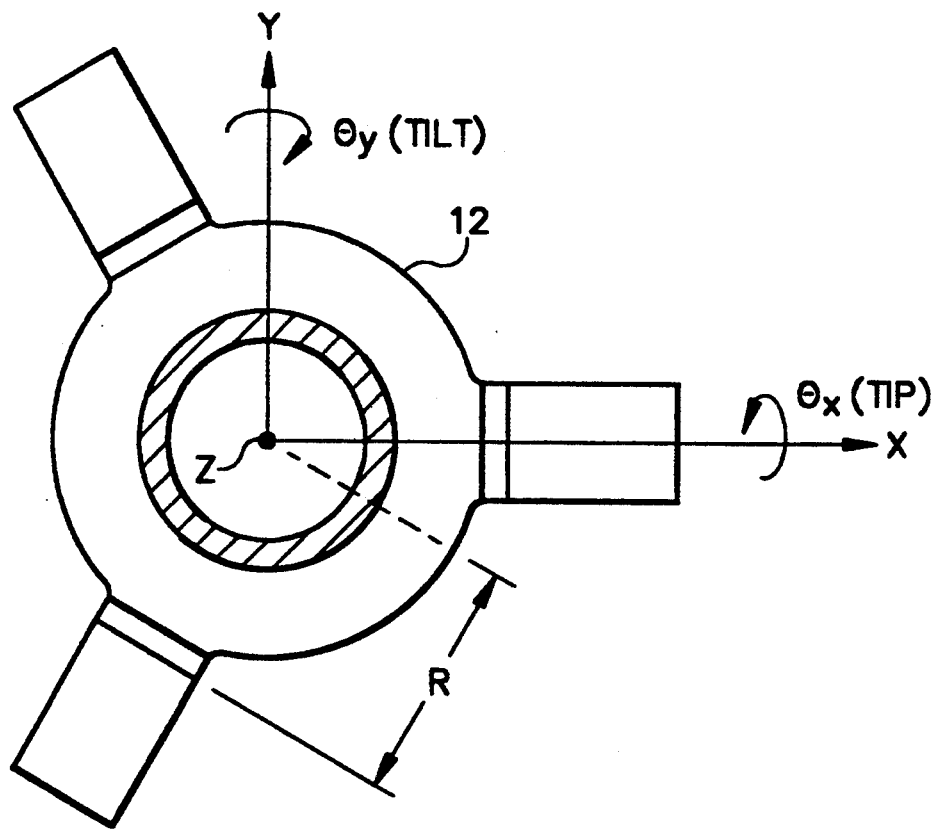
FIG. 9 is a top view of the collimating lens mount of FIG. 8, with representations of the tilt, tip, and x, y, and z axial motions of the collimating lens.

With reference also to FIG. 9, it will be appreciated that due to the elastic coupling by the elastic kinematic hinges between the lens mount 13M and the actuators 14A, 14B, 14C, the selective operation of one or more of the actuators allows one to obtain a highly accurate, selectably controllable rotation angle $\phi$ and/or a resulting displacement dR in the collimating lens radial position R so as to effect tilting $\theta_Y$, or tipping $\theta_X$ of the collimating lens. Alternatively, the actuators 14A, 14B, 14C may be operated in unison to provide a highly-accurate, selectably-controllable z axial displacement of the collimating lens along the optical axis 13A. Such z axial motion of the collimating lens is useful not only to achieve active athermalization of the collimating lens 13, but also for adjustment of, for example, beam focusing. A still further alterative is a selected operation of the actuators to provide a desired combination of tilt $\theta_Y$, tip $\theta_X$, z axial motion, and lateral x or y axial motion of the collimating lens.

The combined athermalization and control of the collimating lens in the optical head assembly 10, in the manner taught herein, has several advantages. Most importantly, the desired compensation for the perturbations and nonlinearities that influence the optical performance of the optical head assembly may be implemented automatically by extremely accurate displacements of the collimating lens in one or more of five degrees of freedom (axial x, axial y, axial z, tilting $\theta_Y$, or tipping $\theta_X$). Proper selection of the actuator controller signals allows the collimating lens position to be electronically controlled, thus allowing important optical performance parameters, such as beam focus and beam position, to be controlled more easily and accurately than found in conventional apparatus.

Accordingly, the optical head assembly is contemplated for use in, for example, a beam scanner whereby the range, resolution, and accuracy of the scanning beam can optimized even while beam scanning is occurring, by active adjustment of the collimating lens position. The present invention thus contemplates the use of additional feedback signals from, for example, a beam focus or beam alignment sensor such that the scanning beam can be controlled in a closed-loop, "on the fly" manner. Similarly, accurate control of the light beam focusing, position, or motion (while compensating for changes in ambient temperature, humidity, or other variations of system parameters) can be accomplished by feedback from still other appropriate sensors.

The contemplated optical head assembly is relatively simple to construct and has no frictionally-engaged parts, and thus is capable of operating with an inherently high reliability over a long life. Precision assembly and installation of the optical head assembly is not critical, since its performance variations may be canceled by defining a baseline electronic calibration after the optical head assembly is manufactured and installed. Such calibration may be calculated without resort to a sophisticated optical alignment system, and if calibration is necessary, the above-described adjustment by remote control of the thermal rotary actuators allows one to calibrate the optical head assembly without dismantling the assembly.

The invention has been described in detail with particular reference to the preferred embodiments thereof, but it will be understood that variations and modifications can be effected within the spirit and scope of the invention.

What is claimed is:

1. An actively athermalized optical head assembly, comprising:
    (a) a collimating optics mount including a flexure plate, light beam collimating optics fixed on the flexure plate and thereby defining an optical axis, and three flexure plate extensions being substantially equally distributed about the optical axis and each being attached to the flexure plate at a respective elastic kinematic hinge; and
    (b) a light beam source mount having located thereon actuator means and a light beam source so as to direct a light beam through said collimating optics, said actuator means being operatively connected to each of the mount extensions for selective coupling of a displacement force through the respective elastic kinematic hinge to effect an adjustment of the position of the collimating optics with respect to the beam source.

2. The actively athermalized optical head assembly of claim 1, wherein the elastic kinematic hinges each further comprise an annular notch in the flexure plate.

3. The actively athermalized optical head assembly of claim 1, wherein the actuator means further comprises three actuators each of which being operatively connected to a selected one of the extensions, and each being responsive to an actuator drive signal.

4. The actively athermalized optical head assembly of claim 3, further comprising actuator control means for receiving control signals and for converting said signals to provide said actuator drive signal.

5. The actively athermalized optical head assembly of claim 3, wherein at least one actuator comprises a thermal rotary actuator that includes:
    (a) an actuator body having first and second spaced linear actuator elements, each linear actuator element having a respective predetermined coefficient of thermal expansion (CTE) and respective first and second ends defining the linear actuator element length, said linear actuator elements, in response to a temperature differential therebetween, being thereby subject to a predetermined length differential, and means for effecting the selected temperature differential in the first and second linear actuator elements to achieve the predetermined length differential in response to an actuator drive signal;
    (b) first yoke means for receiving the first ends of the first and second linear actuator elements, including fixing means for fixing the first ends in a predetermined spatial relationship and means for flexibly attaching said first ends to the light beam source mount; and
    (c) second yoke means for receiving the second ends of the first and second linear actuator elements and for flexibly attaching the second ends of the first and second linear actuator elements to the respective flexure plate extension to thereby translate the predetermined length differential to a proportional displacement of the extension.

6. The actively athermalized optical head assembly of claim 5, further comprising actuator control means for receiving control signals and for converting said signals to provide said actuator drive signal, wherein the actuator control means further comprises:

first and second thermistors embedded in the first and second linear actuator elements to provide respective temperature sense signals;

first and second signal conditioners for receiving the temperature sense signals and for providing scaled conditioned signals;

a differential amplifier for obtaining the difference of said scaled conditioned signals to provide a difference signal;

a summer to add the difference signal to the control signal to provide a positioning control signal; and a pulse width modulator operative in response to the positioning control signal to provide said actuator drive signal.

7. The actively athermalized optical head assembly of claim 1, wherein the collimating optics further comprises a collimating lens centrally located in the flexure plate.

8. The actively athermalized optical head assembly of claim 1, wherein the light beam source further comprises a laser diode.

9. The actively athermalized optical head assembly of claim 1, wherein the light beam source further comprises a light beam source cooling means.

10. The actively athermalized optical head assembly of claim 1, further comprising a bellows situated between the beam source mount and the collimating optics mount.

11. An actively athermalized optical head assembly, comprising:

(a) a collimating optics mount including a flexure plate, a collimating lens centrally fixed on the flexure plate and thereby defining an optical axis, and three flexure plate extensions being substantially equally distributed about the optical axis and each being attached to the flexure plate at a respective elastic kinematic hinge;

(b) a light beam source mount having located thereon a light beam source so as to direct a light beam through said collimating lens, and three actuators each of which being responsive to an actuator drive signal and being operatively connected to a selected one of the mount extensions for selective coupling of a displacement force through the respective elastic kinematic hinge to effect an adjustment of the position of the collimating lens with respect to the beam source; and (c) actuator control means for receiving collimating lens positioning control signals and for converting said signals to provide said actuator drive signal.

* * * * *